April 9, 1968   L. L. DICKERSON   3,377,544
ADAPTIVE EXPONENTIAL GENERATOR
Filed May 20, 1965
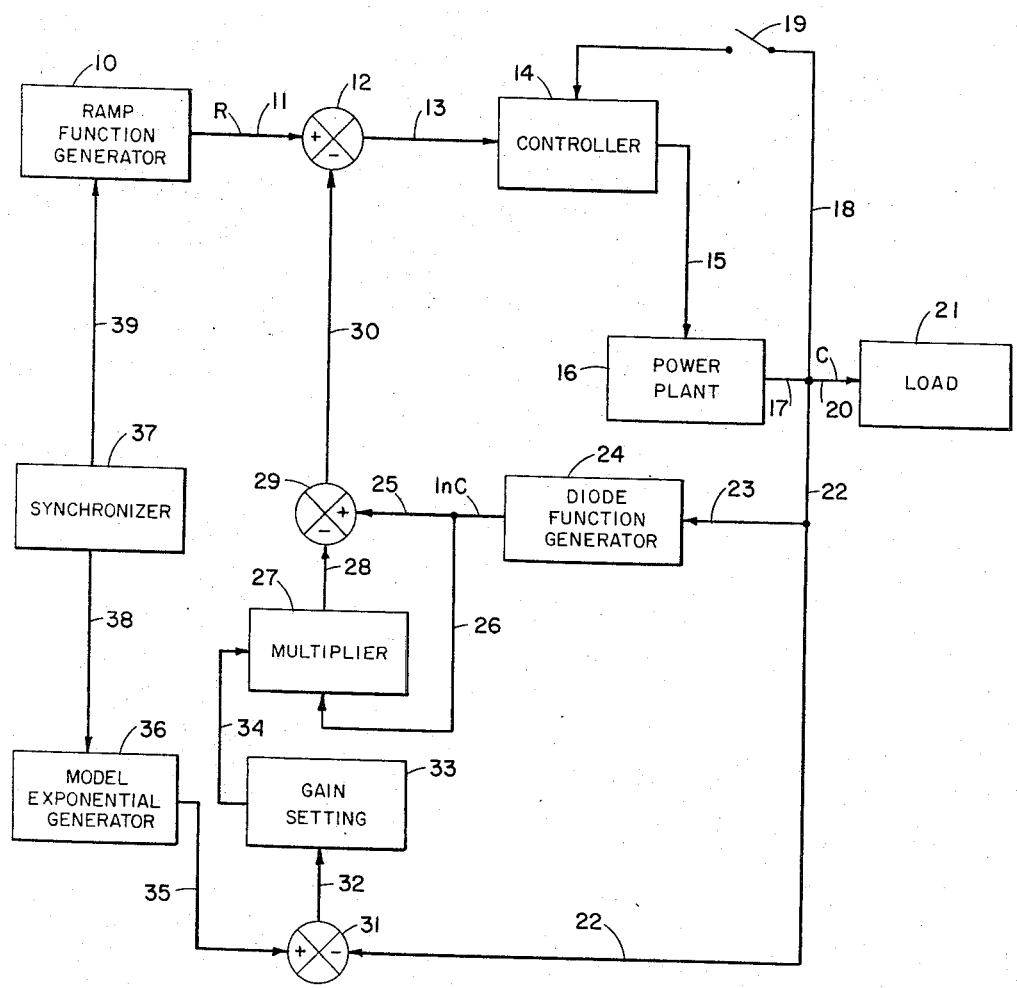
Loren L. Dickerson,
INVENTOR.
BY

3,377,544
ADAPTIVE EXPONENTIAL GENERATOR
Loren L. Dickerson, Huntsville, Ala., assignor to the United States of America as represented by the Secretary of the Army
Filed May 20, 1965, Ser. No. 457,534
7 Claims. (Cl. 322—28)

ABSTRACT OF THE DISCLOSURE

A high-power generator capable of delivering an exponential output. The output is generated in response to a linear signal input, by using a logarithmic feedback in controlling the generator.

This invention may be manufactured and used by or for the Government for governmental purposes without the payment of any royalties thereon.

The invention described herein relates to an adaptive exponential generator with constant fractional error.

In the field of aerospace research, experiments are conducted designed to simulate conditions encountered by a body entering the atmosphere of the earth. These experiments employ wind tunnels wherein the effects of temperature, velocity, and pressure may be studied. An arc plasma stream is used to provide a high temperature source. The power needed by the arc plasma heaters to create the representative plasma stream increases exponentially in 10 to 15 seconds to more than 100 times its initial level, and this input must be held to a 0.5 percent maximum deviation from the required power at any point across the power scale in order to achieve the desired accuracy of simulation of entry.

In a particular setup, a number of large D.C. generators are used as a power source for the plasma heaters. The generators are driven at a constant speed, and the output is regulated by varying the excitation of the field. Because of the inherently slow response of the fields to changing signals, considerable excess voltage must be applied by power amplifiers exciting the field windings to force a more rapid response.

Power amplifiers having exponential inputs and linear feedbacks were tested. When using this system, it was found that the output deviation from the power program (as represented by an ideal exponential) could be reduced by increasing the exponent of the input to a level above that called for by the program. With this arrangement, however, the system could only hold the error to 0.5 percent (or less) of the full scale power, rather than the instantaneous or present value of power. Consequently, at low power readings, the deviation from the desired value could be larger than the value itself.

To make the error a reasonable and more nearly constant fraction throughout the power range, the linear feedback control system was replaced by a system using a linear input and logarithmic feedback. When the logarithm of the output is fed back and the control amplifier is linear with a gain of K, the steady-state error signal is given in generalized form by:

$$\frac{C}{K} = r - \ln C$$

Wherein C is the output, r is the input, and K is the gain of the amplifier. The term ($-\ln C$) represents the feedback.

Solving for the output:

$$C = e^r e^{-\frac{C}{K}}$$

If the power plant and its control amplifier has infinite gain (K=infinity), the output with logarithmic feedback would equal the exponential of the input. With finite gain, however, the output would deviate from the desired $e^r$ by a factor of $$e^{-\frac{C}{K}}$$

If the gain K were made proportional to C, the error could then be compensated for by a program advanced in time or altered by a constant factor. This proportionality can be accomplished by introducing a device in the forward path to multiply the error signal by the output. The new reference then becomes:

$$R = r - \frac{1}{kC}$$

wherein $k$ is the multiplication factor.

It was found that the system could be further improved by automatically decreasing the gain of the logarithmic feedback in accordance with a predetermined program, that is, to make the system adaptive. This was accomplished by using a time-function generator with a highly accurate exponential output to control the exponential feedback of a diode function generator. The said generator would operate from the same time reference as the linear input R.

An object of this invention is to provide an adaptive exponential power generator.

Another object is to provide an exponential power generator having a constant fractional error.

Yet another object is to provide a power generator which can generate and accurately maintain the exponential of a linearly varying control signal.

A further object is to provide a power generator which can generate an output which is the exponential of a steady-state control signal.

The invention may be best understood by a reference to the drawing in which the single figure shows a block diagram of a preferred embodiment of the invention.

In the drawing, numeral 10 indicates a source of linear input signals, or ramp functions. This may consist of nothing more than a voltage dividing potentiometer varied in a linear manner by some operator, such as an electric motor. The slope of the ramp could be varied by varying the speed of the motor. The output of the generator is designated R and feeds through lead 11 into a subtractor 12 and then through lead 13 into a controller 14. Controller 14 is an amplifier, the output of which is employed to control the field of the power generators contained in power plant 16, which box would also include a prime mover for the generators. The output C of power plant 16 is fed by conductors 17 and 20 to the load 21. In the particular case, this load is an arc plasma generator. A portion of output C is fed back by conductors 22 and 23 through a diode function generator 24 which has an output equal to the natural logarithm of C, or ln C. This generator, per se, is known in the art and is shown, for example, on pages 200, 201, and 212 of "Principles of Analog Computation" by Smith and Wood, published by McGraw-Hill Book Company in 1959. The ln C output is fed through conductor 25 to subtractor 29. Also, a portion of the output of generator 24 is fed over conductor 26 to a multiplier 27, which will be discussed later. A portion of the output C on line 22 is also fed into a subtractor 31, which has, as another input, an exponential waveform from a generator 36. The algebraic sum (arithmetic difference) of C and the exponential is passed along conductor 32 to the gain setting means 33, which is merely a potentiometer which may be manually adjusted to attenuate the output of subtractor 31. The adjusted output is then fed along conductor 34 into multiplier 27, which operates to give the product of its two inputs, one from conductor 34 and the other from conductor 26. Multiplier 27 is known in the art and is of the general type of multiplier as shown on pages 34 through 37 of "Analog Computation in Engineering Design" by Rogers and Connolly, published by McGraw-Hill Book Company in 1960. The output of multiplier 27 is fed through conductor 28 to subtractor 29. The output of subtractor 29, through conductor 30, is fed back to subtractor 12 as an error signal.

The model exponential generator 36 generates a highly accurate exponential signal. Generator 36 is time synchronized within the ramp function generator 10 through a synchronizing means 37, via conductors 38 and 39. Means 37 could take any one of several forms, the simplest being a single off-on switch for both generator 36 and generator 10. Generator 36, in the specific example, is a Reeves REAC analog computer. Obviously, other types of exponential generators could be used, if desired.

There is an additional feedback path for C through conductor 18 and switch 19, which path will be discussed below.

Operation

Operation of the system is as follows: A ramp function R having the desired properties is provided by generator 10, and passed through subtractor 13 into controller 14, which controls the field of the power generator in power plant 16, which, in turn, feeds the load. A portion of the output of the power generators is fed back through generator 24, and the output ln C is fed into subtractor 29. At the same time, a portion of output C is also fed into subtractor 31, along with an exponential from generator 36. The output of subtractor 31 is used as a control signal for the gain of multiplier 27. A portion of the output ln C of generator 24 is fed into multiplier 27. The output of multiplier 27 is then fed into subtractor 29 so that the output of subtractor 29 is the sum of ln C and the multiplied ln C. This output (of subtractor 29) is then fed into subtractor 12 as an error signal. As can be seen, multiplier 27 accomplishes the desired result of making the feedback signal on conductor 30 proportional to the output C. Generator 36 provides the adaptive feature through its action on multiplier 27.

The feedback path 18 through 19 may be used for power levels near full power output of the generator. This path allows the gain of the amplifier in controller 14 to be controlled automatically in accordance with the output power. Switch 19 may be manually controlled or relay operated and closed near full power level or any other desired level by a transfer circuit.

If desired, the ramp input R may be held at a steady-state value. The power output of the plant would then, naturally, be the amplified exponential of the said steady-state value. At the same time, a steady state exponential of R would be provided by the exponential generator 36.

While the invention has been specifically described as being used with a high power generator setup, it could, obviously, be used to advantage in low power applications.

The invention has been disclosed as applicable to a particular type of generator and load, but it, obviously, could be used to control other types of plants with other types of outputs, such as chemical, pneumatic, hydraulic or mechanical where it may be desired to supply or control an exponentially varying quantity.

Invention is not claimed for the individual elements of the disclosed combination since they, of themselves are each individually known, but rather the invention resides in the novel combination of elements to arrive at a new and desirable result.

I claim:

1. An exponential generator having a control input and a power output, said generator comprising: a first subtractor having plural inputs and an output, the output of said subtractor being connected to said generator control input, a ramp function generator connected to an input of said first subtractor, a feedback network connected to the output of said generator, said feedback network including logarithmic means having an output, for generating the logarithm of the power output signal of said generator, the output of said logarithmic means being connected to a second subtractor having plural inputs and an output, said output being connected to an input of said first subtractor, an exponential signal generator, means for maintaining a timed relationship between the operation of said ramp function generator and said exponential signal generator, said exponential signal generator having an output connected to an input of a third subtractor having plural inputs and an output, the output of said power generator being connected to another input of said third subtractor, the output of said third subtractor being connected as a gain control to the control terminal of a multiplier having an input, output and control terminals, the output of said logarithmic means being connected to the input of said multiplier, and the output of said multiplier being connected to an input of said second subtractor.

2. An exponential power generator having a control input and a power output, a feedback path connected to said output, a ramp function generator connected to said input, said feedback path including a function generator for generating as an output the logarithm of an input thereto and feeding the generated output to the control input of said power generator said feedback path further including gain control means to vary the amount of the output of the function generator fed back.

3. The generator of claim 2 wherein said control means is varied in gain by the output of said power geenrator.

4. The generator of claim 2 wherein said control means is an amplifier.

5. The generator of claim 2 wherein said control means is an attenuator.

6. An adaptive exponential power generator having a control input and a power output, a ramp function generator and an exponential generator both time controlled by a synchronizing means, said ramp function generator being connected to the control input of said power generator; a feedback path, said feedback path including means for generating the logarithm of the output of said power generator and means for feeding said logarithm to a first subtractor, and a multiplier means, second subtractor means in said feedback path for algebraically summing a portion of the output of said power generator with the output of said exponential generator, said multiplier means being controlled by the output of said second subtractor, the output of said multiplier being connected to said first subtractor and with the output of said first subtractor being connected to said control input of said power generator.

7. An adaptive exponential controller having an input and an output and comprising: linear input means connected to said controller input, multiplier means having a control terminal, an input terminal, and an output terminal, logarithmic feedback means connected between the output of said controller and the input terminal of said multiplier, model exponential generator means connected to control terminal of said multiplier, and means connecting the output terminal of said multiplier to the input of said controller.

References Cited

UNITED STATES PATENTS 3,243,803   3/1966   Thue.

OTHER REFERENCES

Mariner II Instrumentation, Electronics, Dec. 14, 1962, pp. 42–45.

JOHN F. COUCH, *Primary Examiner.*

H. HUBERFELD, *Assistant Examiner.*